Nov. 9, 1948.                    E. L. KROPA                    2,453,666
                  COMPOUND OPTICAL ELEMENT CEMENTED WITH
                         A POLYESTER OF MALEIC ACID
                            Filed Jan. 21, 1944
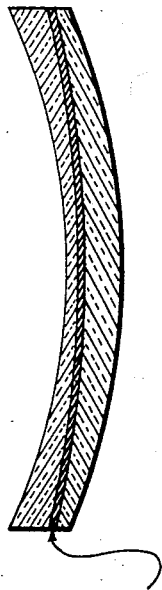
COPOLYMER OF POLYESTER
OF MALEIC ACID AND
VINYL COMPOUND
INVENTOR.
EDWARD L. KROPA,
BY
Elizabeth Ann Krider
AGENT

SEARCH ROOM

Patented Nov. 9, 1948

2,453,666

UNITED STATES PATENT OFFICE 2,453,666

COMPOUND OPTICAL ELEMENT CEMENTED WITH A POLYESTER OF MALEIC ACID

Edward L. Kropa, Old Greenwich, Conn., assignor to American Cyanamid Company, New York, N. Y., a corporation of Maine Application January 21, 1944, Serial No. 519,199

4 Claims. (Cl. 88—57)

This invention relates to optical elements for the transmission, reflection or diffraction of light, such as lenses, prisms, filters, etc.

In the production of compound lenses as well as in other forms of optical elements which comprise two or more optical components, it has been customary to seal the compounds together in order to prevent the loss of light which would occur without the presence of the cementing agent. In order to achieve maximum light transmission the cementing material should have an index of refraction equal to or near the index of refraction of at least one component of the optical element. In other words, if the components of the optical element be made of glass, it is desirable that the cementing material have an index of refraction equal to or near that of at least one of the glass components which are to be cemented together. It is, in many cases, desirable that the cementing material have an index of refraction between the indices of refraction of two of the substances such as two of the glasses of which the components of the optical element are composed. Most of the cementing agents which have the other required characteristics for this purpose do not have an index of refraction sufficiently high.

In filters it is desirable that the bonding agents have resistance to the cleaning liquids, gases or immersion oils and filtering solutions to which they may be subjected while in use.

Cementing agents for the different components of optical elements should have good adhesion to glass or to any other substance of which the element may be made, they should be clear and colorless, they should contain no volatile material after cementing and they should be materials which will set or cure to a solid. Furthermore, the cementing agents should be generally insoluble and preferably infusible. Many of the products previously proposed do not have one or more of these properties, some being colored and others having some other deficiency. Some resinous materials which might be suitable for this purpose require the use of a volatile solvent some of which invariably remains behind and frequently causes the formation of voids in the film of adhesive cement, particularly if the optical element is exposed to high temperatures such as those encountered in tropical countries or those encountered when a lens is exposed to sunlight or arc lights for a relatively long period of time or in unusual circumstances found in industry and in war.

Many cementing agents which are suitable for use in optical elements which are to be used only at ordinary room temperatures are unsuitable for use in those optical elements which are to be subjected to unusual temperature conditions such as the below-zero temperatures encountered, for example, in camera lenses or gun sights used in airplanes or in the winter climates of many parts of the world. At very low temperatures cementing materials which have previously been employed craze or crack and destroy or impair the utility of the optical element.

In the manufacture of lenses it is sometimes desirable to treat the lenses at high temperatures in order to obtain certain desirable characteristics. Previously, it has been necessary to carry out this heat treatment prior to the cementing of the components of the optical elements inasmuch as the cementing materials would soften or darken if subjected to the temperatures required. Accordingly, it would be desirable to employ a cement which would be stable at the temperatures required for the treatment of the lenses so that this treatment could be carried out after the components of the lenses have been assembled. This would enable the lens manufacturer to produce lenses faster and with a smaller amount of labor than that now used.

In view of the foregoing requirements and desiderata for the cementing agents to be used as adhesives for the components of optical elements, my invention has the following objects:

The principal object of my invention is to provide a cementing material which has excellent adhesion to glass and to other substances employed in the production of optical elements, a cementing material which sets or cures quickly to form a colorless clear bonding material having no residual volatile material after setting and having a relatively high index of refraction, that is to say, above about 1.5.

Another object of my invention is to provide an adhesive for the components of optical elements which is stable and which remains clear and colorless at very low temperatures and relatively high temperatures.

Another object of my invention is to provide an improved process for the production of optical elements comprising two or more component parts.

Still another object of my invention is to provide new and improved optical elements comprising two or more components.

A further object of my invention is to produce compound lenses comprising two or more components made of two or more different types of glass.

A still further object of my invention is to provide adhesives having a high index of refraction which are equal to or near the indices of refraction of the glasses having relatively high indices of refraction, such as the flint glasses.

These and other objects are attained by applying to the surfaces of the components of an optical element to be cemented a polymerizable composition comprising (1) at least 25% by weight of at least one substance containing the $CH_2=C<$ group, said substance being a liquid having a boiling point of at least 100° C. and having an index of refraction of at least 1.5, (2) at least 25% by weight of a compatible, polymerizable, unsaturated alkyd resin, (3) a catalyst for accelerating the copolymerization of (1) and (2), and optionally, (4) a polymerization inhibitor. Compatible, polymerizable, unsaturated alkyd resins used in accordance with this invention are those which are obtained by reacting a glycol with maleic acid or anhydride alone or with a modifier including aliphatic polycarboxylic acids, phthalic acid or an aliphatic alcohol containing at least 5 carbon atoms.

A two-component optical element in accordance with the present invention is illustrated in the drawing which is believed to be self-explanatory.

The following examples in which the proportions are in parts by weight are given by way of illustration and not in limitation.

EXAMPLE 1

A composition is prepared by mixing 200 parts of ethylene glycol maleate-sebacate resin (resin "A") with 100 parts of styrene stabilized with about 0.03% of hydroquinone. Such a composition can be stored for long periods of time in the dark. For use, about 0.5–1 part of lauroyl peroxide is blended with about 200 parts of the composition described above to form a homogeneous solution. This solution is applied to the surfaces of the components of an optical element to be cemented together, the coated surfaces are brought together and adjusted in the proper manner to form an assembly, the parts of which are held together in any convenient way until the adhesive is set or cured. To cure the adhesive the optical element may be placed in an oven at about 50° C. for 1 hour and thereafter at about 100° C. for 2 hours. The optical element obtained has excellent clarity, being approximately equal to an equivalent thickness of glass. The glass components of the optical element cannot be pried apart and are not loosened upon exposure to water, ammonium oleate solution, methanol and ethanol. The adhesive is not affected by temperatures below zero nor by temperatures up to about 400° F. and, for shorter periods of time, at 450° F.

The optical element prepared according to this example may be a compound lens having two components, one being crown glass and the other flint glass, and it may be a compound prism having two components, one of crown glass and one of flint glass. The optical element may also be a compound lens or compound prism having three or more components made of two or more different glasses. Furthermore, Nicol prisms may also be made using the adhesive to cement the two faces of the crystal together in the same manner as described above.

EXAMPLE 2

An adhesive cement composed of about 70 parts of an ethylene glycol maleate-sebacate resin (resin "A"), 30 parts of styrene free of polymer and containing about 25 parts per million of t-butyl catechol is prepared. About 0.3 part of lauroyl peroxide is homogeneously blended with 100 parts of the cement at the time it is to be used. It is then used as an adhesive to join together the parts of a compound lens and the resin adhesive is cured after the components of the lens system have been properly assembled and after subjecting the lens to a temperature of about 80° C. for about two hours. Any excess resin which is exposed to the air is uncured and can be removed readily. A compound lens having good clarity and being free from flaws in the adhesive layer is obtained. The compound lens is quite resistant to water, alcohol, glycerine, etc., and does not pry apart easily. The adhesive is also resistant to temperature changes in the same way as the optical elements produced according to Example 1.

EXAMPLE 3

50 parts of ethylene glycol maleate-sebacate resin (resin "A") are mixed with about 0.5 part of benzoyl peroxide and about 50 parts of diallyl phthalate. The resulting solution is used as an adhesive in the formation of optical elements in the manner described in Examples 1 and 2 to produce articles having similar properties. Since diallyl phthalate boils considerably higher than styrene, higher polymerization temperatures may be used if desired, e. g., 150° C. for ½ hour or more.

EXAMPLE 4

200 parts of a propylene glycol maleate resin modified with tetrahydroabietyl alcohol (resin "B") is mixed with 100 parts of paramethyl styrene and about 1 part of lauroyl peroxide. The resulting adhesive may be partially cured by exposure to ultraviolet radiation or by heating for a few minutes, e. g., 10–20 minutes at about 50° C. Thereafter, the adhesive is applied to the surfaces of the components of the optical element and the components of the optical system are assembled; any entrapped air is removed by working the parts; the components are properly adjusted, and then the adhesive is polymerized. This may be done by means of ultraviolet light which is applied to one or more surfaces of the optical element and transmitted through them to the film.

If desired, the resin may be mixed with the styrene and lauroyl peroxide and applied without the preliminary polymerization, and in either case, the final polymerization may be carried out by heating for ½–4 hours at temperatures of about 70°–110° C. either alone or with some radiation such as ordinary light or ultraviolet light.

EXAMPLE 5

50 parts of a diethylene glycol-maleate-adipate resin (resin "C") is mixed with 50 parts of styrene and about 0.002 part of t-butyl catechol thereby forming an adhesive which is substantially stable for a considerable period of time but which may be easily polymerized upon being subjected to polymerization conditions by the addition of peroxides or by the use of heat, light or any combination thereof.

The adhesive prepared in the manner set forth above is applied to the surfaces of the components of a compound lens after those components have been heated to a temperature of about 80° C. The component parts of the optical element are assembled and placed in a jig for a few minutes, e. g., two minutes. After proper adjustment and the removal of any entrapped air, the compound lens is removed from the jig, the resin adhesive having set sufficiently to hold the components together if carefully handled. The lens is then placed in an oven at a temperature of about 70–100° C. for about ½–4 hours and during this time the polymerization may be accelerated by subjecting the lens to ultraviolet radiation if desired. Compound lenses produced in this manner are well secured together and they have excellent clarity, transmit an extremely high proportion of the light entering the lens and the bond in them is very resistant to water and ordinary organic liquids.

EXAMPLE 6

A compound lens composed of a crown glass component having an index of refraction of about 1.52–1.54 is partially corrected with a component made of a flint glass having a higher index of refraction. The components are cemented together in accordance with Example 1. The polymerized adhesive employed in Example 1 has an index of refraction of about 1.54 and therefore the lens prepared according to this example has excellent optical properties including the transmission of a high proportion of the light directed through the lens and a very small proportion of such light is lost.

EXAMPLE 7

The surfaces of the glass components of an optical element to be cemented together are cleaned by washing with a detergent solution and then with distilled water. The surfaces to be cemented together are then treated with an aqueous acidic (HCl) solution of stannous chloride. This may be done by dipping the glass components into the solution. After the treatment the glass is dipped into distilled water thereby forming a thin adherent film of the tin salt on the glass. Powdered chalk is applied to the glass surfaces to be joined together and the surfaces rubbed clean. The components of the optical element are then cemented together in accordance with any of the preceding examples.

EXAMPLE 8

The procedure of Example 7 is followed except that, prior to cementing, the cleaned surfaces of the components to be cemented together are treated with a dilute (e. g., 1%) solution of diallyl silicone dichloride and then dried. The solvent for the diallyl silicone dichloride may be any nonreactive organic solvent such as the hydrocarbons, e. g., benzene, toluene, etc. After cementing the element can be pried apart only with difficulty and the adhesion is so great that tiny bits of glass are torn from the separated surfaces.

*Preparation of Resin "A"*

6 mols of ethylene glycol, 5 mols of maleic anhydride and 1 mol of sebacic acid are heated at about 180° C., preferably under an inert atmosphere of carbon dioxide or nitrogen. The reaction is carried out for about 8–12 hours until an acid number of about 50 is obtained.

*Preparation of Resin "B"*

5 mols of propylene glycol, 1 mol of tetrahydroabietyl alcohol and 5.5 mols of maleic anhydride are heated with agitation and preferably under an inert atmosphere at about 180° C. for about 8–12 hours until an acid number of about 50 is obtained.

*Preparation of Resin "C"*

Resin "C" is prepared in the same manner as described in the preparation of resin "A," except that 1 mol of adipic acid is substituted for 1 mol of sebacic acid and 6 mols of diethylene glycol are substituted for the ethylene glycol.

The unsaturated alkyd resins suitable for use in accordance with my invention may be prepared in the manner described in my copending applications, Serial Nos. 248,535, 248,536, 248,537, 494,348, 494,349 which have become, respectively, Patents 2,443,736 and 2,443,737 dated July 12, 1943, and 495,212, which has become Patent No. 2,409,633, dated October 22, 1940, now abandoned. To be suitable for use in accordance with the present invention, the resin should form a syrup when mixed with the substances containing the $CH_2=C<$ group and it should be soluble in the latter substance to the extent of at least 25% by weight based upon the total of resin and substance containing the $CH_2=C<$ group. To obtain such properties the total hydroxyls in the reactants should be approximately equal to the total carboxyls on a molar basis. The resin should contain at least a major proportion of maleic acid as compared to any other acid on a molar basis and similarly the resin should contain a major proportion of a glycol as compared to the total alcohol employed on a molar basis.

In order to obtain resins which are compatible with styrene and other aromatic hydrocarbons, the resins should be modified by including in the reacting materials a saturated aliphatic alcohol containing at least 5 carbon atoms or with a saturated aliphatic dicarboxylic acid, phthalic acid or a hydrogenated phthalic acid such as tetrahydrophthalic anhydride. The term "acids" as used herein is intended to cover the anhydride as well as the acid. Examples of aliphatic dicarboxylic acids suitable for use in accordance with my invention are: succinic acid, glutaric acid, adipic acid, azelaic acid, brassylic acid, sebacic acid, pimelic acid, suberic acid etc.

Any glycol may be used and examples thereof are: ethylene glycol, diethylene glycol, triethylene glycol, tetraethylene glycol, pentaethylene glycol, hexaethylene glycol, heptaethylene glycol, propylene glycol, dipropylene glycol, dibutylene glycol, decamethylene glycol, 1,3-butandiol, octadecandiol, etc. If desired, part of the glycols may be replaced by other polyhydric alcohols such as glycerol and pentaerythritol. Since the polyhydric alcohols containing more than two hydroxyl groups react very readily with fumaric acid, it is preferable that some monohydric alcohols be used in conjunction with the alcohols which contain more than two hydroxyl groups or that some monobasic acid be used.

Monohydric alcohols which may be used as modifiers include: the amyl alcohols, n-hexanol, cyclohexanol, methyl cyclohexanol, capryl alcohol, 2-ethylhexanol, n-decanol, undecanol, dodecanol, cetyl alcohol, octadecanol furfuryl alcohol, tetrahydrofurfuryl alcohol, tetrahydroabietyl alcohol, etc.

Examples of monobasic acids which may be used as modifiers include: acetic acid, propionic acid, butyric acid, caproic acid, stearic acid, undecylenic acid, acrylic acid, methacrylic acid, oleic acid, linoleic acid, etc. Hydroxy acids may also be used if desired, e. g., omega-hydroxy decanoic acid, α-hydroxy isobutyric acid, lactic acid, ricinoleic acid, etc.

All of the reactive substances suitable for use according to my invention for reaction with a reactive resin are characterized by the presence of the reactive group $CH_2=C<$ and none of them contain conjugated carbon-to-carbon double bonds. Compounds containing a conjugated system of carbon-to-carbon double bonds are known to react with themselves or with other unsaturated compounds, such as the maleic esters, by a 1,2-1,4 addition mechanism such as that which has become generally known as the Diels-Alder reaction. On the other hand, compounds such as those used according to the present invention and which contain no conjugated carbon-to-carbon double bonds obviously cannot undergo this type of reaction with the fumaric esters. Accordingly, my invention is not directed to the use of unsaturated compounds containing conjugated systems of carbon-to-carbon double bonds. Many substances which contain a carbon-to-carbon double bond conjugated with respect to oxygen are suitable for use according to my invention since they do not react with unsaturated alkyd resins in an undesirable manner, but, instead, copolymerize or interpolymerize to form substantially infusible, substantially insoluble resins.

The unsaturated alkyd resins employed in accordance with my invention are preferably those having an acid number not greater than 50 although in some cases resins having an acid number as high as 100 may be desirable. Generally, the acid number should be as low as possible, but this is sometimes controlled by practical considerations of operation such as time, temperature and economy.

The resins should be so formulated that the carboxyl groups of the acids are reacted with the theoretical molal equivalent of the hydroxyl groups of the alcohols. In this connection it is to be noted that the hydroxyl groups of modifying alcohols as well as the carboxyl groups of modifying acids should be included with the hydroxyl groups and carboxyl groups of the principal reactants, the polyhydric alcohol and the alpha, beta unsaturated polycarboxylic acid, respectively.

Resins which contain a plurality of alpha, beta enal groups are sensitive to light, heat and polymerizing catalysts. Since oxygen tends to cause these resins to polymerize, it is desirable that the resins should be made in the absence of this substance, especially when colorless resins are required. The exclusion of oxygen and polymerizing catalysts is desirable during the preparation of the resin and the presence of dissolved oxygen in the original reactants is also preferably avoided. Moreover, dust and extraneous particles that reagents may pick up usually should be removed, especially if colorless resins are desired. One manner in which the dissolved gases and other extraneous impurities may be removed is through the distillation of the ingredients into the reaction chamber in the absence of air.

In order to keep oxygen from contact with the reactants an inert gas such as carbon dioxide or nitrogen may be introduced into the reaction chamber. This may be done either by merely passing the gas over the surface or by bubbling the gas through the liquid reactants. In the latter instance it may be made to perform the added function of agitating the mixture thus eliminating the necessity for mechanical agitation. The inert gas will also carry away at least part of the water formed and toward the end of the reaction it can be used to carry away the reactants still remaining unreacted. Upon separation of the water vapor the used carbon dioxide or other inert gas would be particularly suitable for making high grade colorless resins since any residual reactive impurities such as oxygen would have been removed in its pasage through the first bath of resin reactants.

The effect of light is not so important if the reactants are purified and the reaction carried on in an inert atmosphere as outlined above. However, as an added precaution the esterification may be conducted in the dark. It is also advisable to avoid local overheating and discoloration is minimized if the reaction is conducted below a temperature of about 200° C. To avoid overheating it is advisable to raise the temperature slowly at the beginning, especially if an anhydride be used since the reaction between an anhydride and an alcohol is exothermic.

Since the viscosity of the resin frequently becomes quite high if the esterification is carried to a low acid number, it may be desirable to produce the resin under azeotropic conditions. Accordingly, the estification is conducted in an organic solvent which dissolves the reactants as well as the resultant resin and which is preferably substantially insoluble in water. Examples of these are: benzene, toluene, xylene, chloroform, carbon tetrachloride, ethylene dichloride, propylene dichloride, ethylene and propylene trichlorides, butylene dichloride and trichloride and also higher boiling solvents such as cresol and methyl cyclohexanone although some of these may tend to darken the resin. The mixture is refluxed in such a manner as to separate the water formed by the esterification. Much lower temperatures are used than are used under the conditions outlined in Examples 18–20. Suitable temperatures range between 90–145° C., for example, for the lower boiling members of the group of solvents set forth above. Obviously, this will vary with different solvents and with different concentrations of solvent. The range of preferred concentrations for the inert solvent is from about 25% to about 50%. An esterification catalyst is usually necessary because a comparatively low temperature is employed. Examples of these are thymol sulfonic acid, d-camphor sulfonic acid, naphthalene sulfonic acid and p-toluene sulfonic acid. Obviously other known esterification catalysts could be used. A resin having any particular acid number if made azeotropically will usually have a lower viscosity than one of the corresponding acid number not made azeotropically.

The reactive compounds containing the $$CH_2=C<$$

group suitable for use in accordance with the present invention are those which boil at a temperature above 100° C. and which have an index of refraction of at least 1.5. Examples of such substances are: diallyl phthalate, the diallyl o-, m-, and p-monochlorophthalates; each of the diallyl dichlorophthalates; the o-, m-, and p-methyl styrenes; the o-, m-, and p-isopropenyl toluenes; the dimethyl styrenes (2,3-, 2,4-, 2,5-, 2,6-, 3,4- and 3,5-); the o-, m-, and p-dichlorostyrenes; each of the nitrostyrenes; each of the hydroxystyrenes; each of the mono- and di-bromostyrenes; vinyl naphthalene; the o-, m-, and p-vinyl diphenyls; etc.

If these be a high proportion of aliphatic substitutents in the reactive compound containing the $CH_2=C<$ group, as for example, with any styrene having a plurality of alkyl groups in the molecule, it is preferable that alkyl resins having side chain methyl groups be used, e. g., resin "B," or if desired, resins containing a relatively high proportion of aliphatic saturated dicarboxylic acid may be used.

During the polymerization of my resinous adhesives the index of refraction increases. Accordingly, it is possible to obtain adhesives having indices of refraction equal to that of most of the different types of glasses. By selecting the proper substance containing the $CH_2=C<$ group for any particular polymerizable unsaturated alkyd resin it is possible to obtain many different products of different refractive indices. In order to obtain any desired refractive index it may be desirable to employ a small proportion, e. g., up to about 30%, based upon the total weight of the polymerizable mixture of a reactive substance containing the $CH_2=C<$ group which does not have a refractive index of at least 1.5. Examples of substances containing the $CH_2=C<$ group which may be included in my adhesives are: diallyl adipate, diallyl carbonate, diallyl sebacate, methyl methacrylate, ethyl acrylate, acrylonitrile, tetraallyl silicate, diallyl maleate, diallyl endo-methylenetetrahydrophthalate, diallyl tetrahydrophthalate and each of the many other examples set forth in my copending application, Serial No. 487,034, filed May 14, 1943, now abandoned, and in my copending applications, Serial Nos. 494,348-9, and Serial No. 495,212.

The polymerization catalysts useful for accelerating the copolymerization of the ingredients of my adhesives include the organic superoxides, aldehydic and acidic peroxides. Among the preferred catalysts there are: the acidic peroxides, e. g., benzoyl peroxide, phthalic peroxide, succinic peroxide and benzoyl acetic peroxide; fatty oil acid peroxides, e. g., coconut oil acid peroxides, lauric peroxide, stearic peroxide and oleic peroxide; alcohol peroxides, e. g., tertiary butyl hydroperoxide usually called tertiary butyl peroxide and terpene oxides, e. g., ascaridole. Still other polymerization catalysts might be used in some instances such as soluble cobalt salts (particularly the linoleate and naphthenate), p-toluene sulfonic acid, aluminum chloride, stannic chloride and boron trifluoride.

The term "polymerization catalyst" as used in this specification is not intended to cover oxygen contained in the resin as in impurity. While this small amount of oxygen would only catalyze the reaction to a very small extent, in order to eliminate any ambiguity the term polymerization catalyst is specifically defined as excluding any oxygen present as in impurity in the resin itself.

The polymerization conditions referred to herein are heat, light, or a combination of both. Ultraviolet light is more effective than ordinary light. The temperature of conversion depends somewhat on the boiling point of the reactive material and also on the pressures used. At atmospheric pressure, as in coating and casting operations, temperatures near or above the boiling point are unsuitable in most instances since substantial amounts of the reactive material would be lost by evaporation before the reaction between the resin and reactive material can be completed. Accordingly, a temperature between room temperature (about 20-25° C.) and the boiling point is usually employed where polymerization of this nature is carried out. The rate of polymerization doubles for about each ten degrees (C.) rise in temperature for this reaction. A temperature is selected which will give a suitable reaction rate and yet not cause substantial volatilization. The following table shows the approximate polymerization temperatures most suitable for the named reactive materials:

| Reactive Material | Temperature Range | Preferred Temperature |
| --- | --- | --- |
| | | ° C. |
| Styrene | 55-120° C. | 80 |
| Diallyl phthalate | Room temp. to about 150° C. | 50-90 |

It may sometimes be desirable to body the reactive mixture before adding the catalyst in order to cut down the induction period which would otherwise be too long. This may be done by heating a mixture of resin and reactive material from about 70° C. to about 110° C., preferably at about 90° C., for a sufficient length of time to substantially reduce the induction period. This time will vary with each resin-reactive material combination with the initial viscosity and other such factors but may be determined by observation of the rise of viscosity. The heating should continue until the viscosity begins to rise rapidly. A general rule for determining the heating time is to heat the mixture until the viscosity is about two to three times the initial viscosity.

After the bodying operation is carried out, the polymerization catalyst is added to the mixture and the whole subjected to polymerization conditions. The use of liquid peroxides instead of solid peroxides is an advantage after bodying the resin mixture since it is difficult to get the solid peroxides dissolved rapidly enough. Peroxides of the coconut oil acids, of oleic acid, or of other fatty acids, tertiary butyl peroxide and ascaridole are suitable liquids.

By the use of this process the induction period is cut down from approximately ½ to ⅛ the time that is required when the bodying process is not used. Even greater reductions are obtained with some mixtures.

In body reactive mixtures containing the reactive resin and a reactive material containing the $CH_2=C<$ group wherein the proportion of reactive material is greater than about 30%, the viscosity rise is so sudden that it may be somewhat difficult to control it. Accordingly, if it is desired to body a resin-reactive material mixture containing more than 30% of reactive material, an alternative procedure is used. By this method one first bodies a mixture containing only 30% of reactive material. Then a small portion of additional reactive material is added, for example, sufficient to make the reactive material concentration 40% and then this is bodied. If still more reactive material is desired, another small portion of reactive material is added and the bodying process repeated. This process is repeated until the desired concentration and viscosity is obtained.

One of the difficulties sometimes encountered in the use of my adhesives which do not contain any stabilizer is that they are not susceptible to storage in the mixed form because polymerization will usually take place even at room temperature within a comparatively short time. Moreover, when it is desired to cure the compositions very rapidly under heat, the reaction becomes at times so vigorous that it cannot be controlled. In order to overcome these difficulties it has been found advisable to incorporate a small proportion of a polymerization inhibitor in the mixture of resin and reactive material. When it is desired to use this mixture, a small percentage of the polymerization catalyst is added, sufficient to overcome the effect of the inhibitor as well as to promote the polymerization. By careful control of the concentrations of inhibitor and catalyst, a uniform product is obtainable with a good reaction velocity. Upon subjection of this mixture to polymerization conditions such as heat, light or a combination of both, and with or without pressure, an infusible, insoluble resin is produced which has many more desirable characteristics than the resins produced by the polymerization of mixtures not containing the polymerization inhibitor such as, for instance, the lack of fractures.

Suitable polymerization inhibitors for this reaction are phenolic compounds, especially the polyhydric phenols and aromatic amines. Specific examples of this group of inhibitors are hydroquinone, benzaldehyde, ascorbic acid, isoascorbic acid, resorcinol, catechol, tannin, t-butyl catechol, sym. di, beta naphthyl p-phenylene diamine and phenolic resins. Sulfur compounds are also suitable.

The concentration of inhibitor is preferably low and I have found that less than about 1% is usually sufficient. However, with most of the inhibitors I prefer to use only about 0.01% to about 0.1%. In some instances where the polymerizable composition is to be used within a few days the concentration of inhibitor may be as low as about 10 P. P. M.

The inhibitor may be incorporated in the reactive resin-reactive material combination (either before or after bodying) or it may be added to the original reactive resin before or during the esterification of the said reactive resin. By adding the inhibitor before the esterification it is sometimes possible to use an inhibitor which would otherwise be substantially insoluble in the reactive resin-reactive material composition. By adding the inhibitor to the unesterified mixture the inhibitor may become bound into the resin upon subsequent esterification.

My adhesives may be used to cement together two or more components of lenses, prisms, photographic filters, Nicol prisms, etc. The optical elements may be made entirely of glass and the glass components may be of one or more different kinds. Furthermore, the components of the optical elements may be composed of other translucent, transparent materials such as plastics or crystalline substances and they may be formed of the same resins as those described herein for use as adhesives. Inasmuch as most optical elements are now made of glass, my invention has been described primarily with reference to the cementing of different types of glass to form lenses, prisms, etc. However, my adhesives give similar excellent results when employed as cementing agents for plastic materials when the plastics are cemented to the same or a different plastic or when cemented to glass. They may also be used to cement gelatine films together for use in the manufacture of filters or for photographic purposes.

If desired, a dye or pigment may be incorporated into my resinous adhesives in order to filter the light passing through the optical element which is bound together with my resinous cements. Such optical elements are particularly useful in filters in photography and for use in binoculars and range finders for proper contrast in brilliant sunlight. Alternatively, the filters can be used for signalling purposes at night.

The optical elements of my invention are useful in almost every field of optics including telescopes, microscopes, eye glasses, gun-sights, bomb-sights, cameras, projectors, spectroscopes, etc.

Obviously, many modifications and variations of the compositions and processes described herein may be made without departing from the spirit and scope of the invention as defined in the appended claims.

I claim:
1. An optical element composed of at least two components of different refractive index and a synthetic clear substantially colorless thermoset adhesive between said components said adhesive having an index of a frection of at least 1.5 and being a copolymer of a composition comprising (1) at least 25% by weight of a substance containing the $CH_2=C<$ group said substance being a liquid having a boiling point of at least 100 C. and having an index of refraction of at least 1.5 and (2) at least 25% by weight of a compatible polymerizable unsaturated alkyd resin which is a polyester of maleic acid.

2. An optical element as in claim 1 wherein said adhesive is a copolymer of a composition comprising (1) at least 25% by weight of a vinyl benzene and (2) at least 25% by weight of a compatible, polymerizable, unsaturated alkyd resin which is a maleic acid polyester of ethylene glycol and which is modified with a saturated aliphatic dicarboxylic acid.

3. An optical element composed of at least two components of different refractive index and a synthetic clear substantially colorless thermoset adhesive between said components, said adhesive having an index of refraction of at least 1.5 and being a copolymer of a composition comprising (1) at least 25% by weight and a substance containing the $CH_2=C<$ group, said substance being a liquid having a boiling point of at least 100 C. and having an index of refraction of at least 1.5 and (2) at least 25% by weight of a compatible polymerizable unsaturated alkyd resin which is an ethylene glycol polyester of maleic acid and a saturated aliphatic dicarboxylic acid.

4. An optical element as in claim 3 wherein said aliphatic dicarboxylic acid is sebacic acid.

EDWARD L. KROPA.

REFERENCES CITED

The following references are of record in the file of this patent:

UNITED STATES PATENTS

| Number | Name | Date |
|---|---|---|
| 576,896 | Rudolph | Feb. 9, 1897 |
| 1,948,636 | Tillyer | Feb. 27, 1934 |
| 2,057,673 | Fields | Oct. 20, 1936 |
| 2,060,104 | Moulton | Nov. 10, 1936 |
| 2,092,789 | Tillyer | Sept. 14, 1937 |
| 2,193,742 | Rohm et al. | Mar. 12, 1940 |
| 2,195,362 | Ellis | Mar. 26, 1940 |
| 2,255,313 | Ellis | Sept. 9, 1941 |
| 2,258,423 | Rust | Oct. 7, 1941 |
| 2,305,224 | Patterson | Dec. 15, 1942 |
| 2,330,663 | Bennett et al. | Sept. 28, 1943 |
| 2,340,109 | D'Alelio | Jan. 25, 1944 |

OTHER REFERENCES

Rust, pp. 64–67, Ind. & Eng. Chem., Jan. 1940.